UNITED STATES PATENT OFFICE.

EMILE AUGUSTE FOURNEAUX, OF MANCHESTER, ENGLAND.

PRODUCTION OF BLACK UPON VEGETABLE TEXTILE FIBERS, SILK FIBERS, OR MIXTURES OF THE SAME.

1,329,117.  Specification of Letters Patent.  Patented Jan. 27, 1920.

No Drawing.  Application filed May 27, 1919. Serial No. 300,145.

*To all whom it may concern:*

Be it known that I, EMILE AUGUSTE FOURNEAUX, a subject of the King of Great Britain, residing at St. James's Building, Oxford street, Manchester, in the county of Lancaster, England, have invented new and useful Improvements in the Production of Black Upon Vegetable Textile Fibers, Silk Fibers, or Mixtures of the Same, of which the following is a specification.

As commonly practised in calico print works the prussiate anilin black process consists in printing or padding textile fibers or fabrics with a solution containing a salt of anilin (generally the hydrochlorid, but the nitrate is also used) together with a chlorate and a ferrocyanid, generally the potassium or sodium salts. The solution may be suitably thickened and in addition to the above essential ingredients it frequently contains others, such as anilin oil, salts of the homologues of anilin, additional catalysts such as vanadium salts, paraphenylenediamin, etc. The relative proportions of the several ingredients vary within fairly wide limits, but the proportion of the anilin salt is nearly always in excess of the amount required for the purpose of converting the ferrocyanid into anilin hydroferrocyanid. Upon the material so prepared the black is developed by steaming, and as a rule a light chroming. The material is then washed and it may be soaped.

Resist prints are produced by printing the material with resist colors, containing alkaline and frequently also reducing agents and for colored resists suitable coloring matters, either before the black mixture is applied, or alternatively the resist colors may be printed on the prepared material, but before developing the black.

The resulting black is more or less greenable, the anilin is not well utilized and a certain amount of tendering is unavoidable, but notwithstanding these well-known defects the process is very largely used, mainly owing to the excellence of the resist effects.

The shortcomings of the prussiate black process may be assumed to be due to the mixture becoming so acid in the course of the development of the black that the formation of ungreenable black is partly inhibited and it has been proposed to replace part of the acid used by organic acids. This can hardly be claimed to have proved a satisfactory solution of the problem, for while it may result in some slight improvement in resistance to greening it does not do so without causing a further and material loss of anilin.

The present invention relates to an improved process of producing prussiate anilin blacks by which these defects are very largely remedied without materially impairing the valuable features of the known process. It is based on the discovery that metaphosphoric acid, though a relatively strong acid, is yet capable of reducing the acidity of the black mixture to such an extent as not materially to interfere with the production of ungreenable anilin black.

The essential difference between my improved process and the known process is in the composition of the solutions used, in that I replace by metaphosphate of anilin in equimolecular proportions a part, usually the greater part, of the anilin salt used in excess of the proportion required to convert the ferrocyanid into anilin hydroferrocyanid.

When preparing the black mixtures or solutions the limited solubility of the metaphosphate of anilin must be considered, also the fact that concentrated solutions thereof are readily precipitated by the addition of relatively small amounts of anilin hydrochlorid, somewhat less readily by anilin nitrate. On material prepared with my solutions the black develops rather more slowly than an ordinary prussiate black, but the rate of development may be regulated on well known lines by the use of additional catalysts, as instanced by example 3.

The chemical equivalents of the metaphosphate of anilin, *i. e.* the anilin salts of orthophosphoric, pyrophosphoric, arsenic and boracic acid are capable of similar action and their use comes within the scope of the invention. Of these salts, those derived from the other phosphoric acids and from arsenic acid are materially less suitable for my purpose on account of deficient solubility, the arseniate moreover on account of its toxic properties. The anilin borate, on the other hand, is unstable in aqueous solution, being extensively hydrolyzed, but boracic acid in conjunction with anilin may be used to advantage in cases where it is desired to reduce the acidity further than can be done conveniently by means of the metaphosphate. In such cases it has been found advantageous to introduce it to the mixture in the form of an acid metaborate.

I append four examples of mixtures giving satisfactory results but it must be clearly understood that they are given only by way of illustration and not necessarily as limitations as the proportions may be varied or modified as found advantageous or desirable.

*Examples.*

*Example 1.*—To five hundred and sixty c. c. prussiate chlorate standard add the solution of ninety-seven and one half grams anilin-hydrochlorid in two hundred and eighty-five c. c. water and two c. c. anilin oil, then twenty-five c. c. chlorate solution and four hundred and sixty c. c. phosphoric standard. Bulk to one thousand four hundred c. c.

*Example 2.*—To five hundred and twenty c. c. prussiate chlorate standard add one hundred c. c. paste and the solution of one hundred and five grams anilin-hydrochlorid in one hundred and eighty-five c. c. water, then eighty-five c. c. acid metaborate solution, twenty-five c. c. chlorate solution and three hundred and eighty c. c. phosphoric standard. Bulk to one thousand three hundred and fifty c. c.

*Example 3.*—To six hundred c. c. prussiate chlorate standard add two hundred and twenty-five c. c. paste and the solution of one hundred and thirty grams anilin-hydrochlorid in two hundred and sixty-five c. c. water, then one hundred and sixty c. c. acid metaborate solution, twenty c. c. chlorate solution, five and one half grams paraphenylenediamin-dihydrochlorid dissolved in sixty c. c. water and 5 c. c. of a solution of vanadium chlorid of such concentration as to correspond to one gram commercial ammonium vanadate in two hundred c. c. Bulk to one thousand four hundred c. c.

*Example 4.*—To five hundred and eighty-five grams prussiate black standard add three hundred and thirty grams paste, ten c. c. anilin oil, eight grams metaphosphoric acid dissolved in sixteen c. c. water, then add thirty-two and one half grams anilin-hydrochlorid, one hundred c. c. acid metaborate solution and twenty-two and one half c. c. chlorate solution. Bulk to one thousand one hundred grams.

The several standards mentioned in the above examples are prepared as follows:—

*Phosphoric standard.*—To one thousand seven hundred c. c. paste add eighty grams metaphosphoric acid dissolved in one hundred and sixty c. c. water, then slowly, while stirring ninety-three c. c. anilin. Bulk to two thousand c. c.

*Prussiate chlorate standard.*—Dissolve one hundred and twenty grams ferrocyanid of soda in five hundred c. c. boiling water, cool, and add one hundred and sixty-six c. c. chlorate solution and water to bulk to eight hundred c. c.

*Prussiate black standard.*—Dissolve one hundred and twenty grams ferrocyanid of soda, hot, in five hundred c. c. paste and seventy c. c. water, then add eighty grams chlorate of soda and finally, when cool, add one hundred and thirty grams anilin-hydrochlorid. Bulk to nine hundred c. c.

*Chlorate solution.*—Dissolve one hundred and six grams chlorate of soda in water to bulk to two hundred and twenty c. c.

*Acid metaborate solution.*—Dissolve thirty-eight grams borax and twenty-five grams boracic acid in water to bulk to two hundred c. c.

*Paste.*—Preferably a neutral starch gum dragon thickening.

The mixtures given in examples, 1, 2 and 3 are intended for padding purposes, that in example 4 for printing purposes.

Application and after-treatment may be as in the ordinary prussiate black process.

What I claim as my invention and desire to secure by Letters Patent is:—

1. An improved process for the production of prussiate anilin black upon vegetable textile fibers, silk fibers, or mixtures thereof characterized by the use of metaphosphate of anilin in place of part, usually the greater part, of the anilin salt used in excess of the proportion required to convert the ferrocyanid into anilin hydroferrocyanid.

2. An improved process for the production of prussiate anilin black upon vegetable textile fibers, silk fibers or mixtures thereof characterized by the use of anilin and boracic acid, substantially as described.

3. An improved process for the production of prussiate anilin black upon vegetable textile fibers, silk fibers, or mixtures thereof characterized by the use of anilin and boracic acid in conjunction with metaphosphate of anilin, substantially as described.

In testimony whereof I have signed my name to this specification.

EMILE AUGUSTE FOURNEAUX.

Witnesses:
S. W. GILLETT,
HERBERT ROWLAND ABBEY.